(12) United States Patent
Wilkinson et al.

(10) Patent No.: US 8,015,920 B1
(45) Date of Patent: Sep. 13, 2011

(54) SOLID FUEL ROCKET THRUST CONTROL

(75) Inventors: David B. Wilkinson, Xenia, OH (US);
James S. Cloyd, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 07/088,350

(22) Filed: Aug. 3, 1987

(51) Int. Cl.
*C06B 45/00* (2006.01)
(52) U.S. Cl. .................. 102/287; 102/291; 244/3.21
(58) Field of Classification Search .................. 102/287, 102/291; 89/8; 244/3.21; 60/253
See application file for complete search history.

(56) References Cited

U.S. PATENT DOCUMENTS

| | | | | |
|---|---|---|---|---|
| 3,195,302 A | * | 7/1965 | Hughes et al. | 60/35.6 |
| 3,434,426 A | * | 3/1969 | De Dapper | 102/100 |
| 4,590,860 A | * | 5/1986 | Kromrey | 102/289 |

* cited by examiner

*Primary Examiner* — Christopher P Ellis
(74) *Attorney, Agent, or Firm* — AFMCLO/JAZ; Gerald B. Hollins

(57) ABSTRACT

A solid fuel rocket burn rate control employing electrical energy preheating of the fuel grain at a plurality of locations dispersed over the grain burn face cross-section as a thrust control arrangement. The electrical energy of the preheating is generated by electrical battery cells which are dispersed across the grain cross-section and are triggered from an inert state into energy generation by burn face heat. The preheating situs moves continually in response to movement of the grain burn face; this is achieved through the use of high temperature electrical battery cell materials responding to the approach of the grain burn face by increased chemical activity and decreased electrical resistance. Preferably, the preheating is directly accomplished by the heat from electrical and other losses in the battery cells.

20 Claims, 2 Drawing Sheets

SOLID FUEL ROCKET THRUST CONTROL

RIGHTS OF THE GOVERNMENT

The invention described herein may be manufactured and used by or for the Government of the United States for all governmental purposes without the payment of any royalty.

BACKGROUND OF THE INVENTION

This invention relates to the field of solid fuel rocket motors and the controlling of thrust in solid fuel rocket motors through the use of electrically controlled fuel preheating.

Solid fuel rockets are preferred for military and long mission uses because of their inherent simplicity and their avoidance of the complex plumbing, mixing and control elements required in liquid fuel rockets and because of the ease and safety with which the rocket fuel, or grain, can be preserved for future use. The design parameters, fuel selection tradeoffs and operating characteristics of solid fuel rockets are well known in the art and are, for example, discussed in the reference textbooks "Rocket Propulsion Elements", 2d ed., by G. P. Sutton, and "Propellant Chemistry" by Stanley F. Sarner.

A characteristics of solid fuel rockets is the difficulty involved in modulation or termination of the thrust-producing reaction once grain burn has commenced. The need for thrust modulation or thrust termination plus re-initiation is readily apparent in practical applications of a rocket in military or scientific uses. The functions of threat avoidance, multiple purpose missions and vehicle atmospheric reentry each present a desirable environment for some form of thrust change, for example.

Questions of complete burn termination and re-ignition are not considered in this specification; present concerns are with thrust modulation or control during the burning of solid fuel rocket grain. Such thrust modulation might, for example, also be desirable in tailoring the placement velocity and the orbit of a spacecraft, in trading thrust magnitude for thrust duration in a rocket, or in balancing the thrust applied to a multiple rocket vehicle, especially during the initial liftoff, low air velocity, flight portion.

The achievement of practical and workable thrust modulation in a solid fuel rocket has been attended by a significant degree of difficulty, however, and in most heretofore practiced arrangements has required significant compromises with respect to rocket payload, reliability, attained degree of control, and added rocket complexity. The variable exit nozzle geometry arrangements previously used for thrust control are, for example, found to be large in physical size, heavy and weight penalizing with respect to rocket payload, requiring of specialized high-temperature, high-strength materials, and productive of large pressure excursions within the propellant combustion chamber. Such nozzle geometry changing arrangements or throttles are also found to be of limited compatibility with the gimbaled or pivoting nozzle arrangements that are commonly employed for guidance and stability control of a rocket and its payload. The pulse modulated solid fuel rocket propellant modulators, although somewhat successful over a limited burn rate schedule, are limited in control ability over the desired larger range of thrust changes and additionally have the characteristic of ejecting unburned inhibitor media. The moving filament throttle arrangements are also cumbered by large weight and space requirements for the attending winch mechanism and are attended by unresolved problems of binding and fusing throttle filament elements so as to be for all practical purposes, not presently desirable.

The use of burn rate increasing energy communicated to local areas of the rocket grain adjacent the burn face in order to produce coning action and increased burn face surface area, is suggested in the patents of Winch et al, U.S. Pat. No. 4,587,805, and DeHaye, U.S. Pat. No. 3,529,425 and presently affords one of the more practical arrangements for controlling solid fuel rocket grain burn rates. The present invention adds a new dimension to this class of burn rate control by additionally simplifying the required controlling apparatus and limiting the mass and volume of control apparatus attending the rocket structure.

SUMMARY OF THE INVENTION

The present invention contemplates use of electrical loss heating and other heat energy developed in an electrical battery cell for grain preheating and for controlling the thrust developed by the fuel grain of a solid fuel rocket. According to the invention the preheating battery cells are disposed across the grain cross section in a manner which is thrust productive predetermined and extend through consumable length of the grain so as to be capable of providing a moving preheat zone as the grain burn progresses—assuming the rocket is an end burn type, however, other rocket types are within contemplation of the invention. According to a further aspect of the invention the preheat zone of the battery cell is triggered into activity by the approaching burn face and its battery actuating heat.

An object of the present invention is therefore to provide a convenient means for controlling the rate of grain burn and thrust development in a solid fuel rocket motor.

Another object of the invention is to provide an electrically operatable thrust control for a solid fuel rocket motor.

Another object of the invention is to provide a solid fuel rocket motor control arrangement which promotes burn surface area increase or coning action in the rocket fuel charge.

Another object of the invention is to provide a solid fuel rocket motor control arrangement which employs a non-fixed location, moving situs source of preheating energy within the fuel grain.

An additional object of the invention is to provide a solid fuel rocket motor thrust control which operates with the use of energy stored within the physical confines of the fuel grain and without the use of externally-sourced electrical energy.

Another object of the invention is to provide a solid fuel rocket motor control arrangement which can employ a combination of electrical conductor and electrolyte generated heating to control the burn rate of the fuel grain.

Another object of the invention is to provide a solid fuel rocket motor thrust control arrangement wherein the employed plurality of thrust control elements may be operated either in unison or under individual control, or according to some predetermined pattern.

Another object of the invention is to achieve the control of solid fuel rocket motor burn rate through the use of high-temperature battery electrolyte materials.

Another object of the invention is to achieve the control of solid fuel rocket motor burn rate through the use of heating action in an automatically determined portion of a control element.

Another object of the invention is to provide a solid fuel grain embedded high temperature battery rocket motor burn rate control wherein one of the battery electrolyte or the battery electrode elements attains the physical state of being a liquid during high temperature burn rate controlling operation.

Additional objects and features of the invention will be understood from the following description and the accompanying drawings.

These and other objects of the invention are achieved by thrust controllable solid fuel rocket motor apparatus having a rocket pressure vessel containing a fuel grain charge and communicating with a rocket nozzle, an arrangement for initiating burn of the rocket fuel at a lengthwise extreme grain face burn surface adjacent the nozzle, an electrical battery heating means including a plurality of battery cell elements extending lengthwise axially through the fuel grain for locally preheating and increasing the burn rate of a plurality of grain regions dispersed across the grain face with battery electrical loss sourced preheat energy, the energy sourcing and localized grain face adjacent grain pre-heating by the battery heating means being enabled in axially local regions of the battery cell elements by battery actuating heat from the grain face burning, and an electrical arrangement connected with the battery cell elements for controlling the quantity of the preheating energy generated therein.

DETAILED DESCRIPTION

Figure 1C:
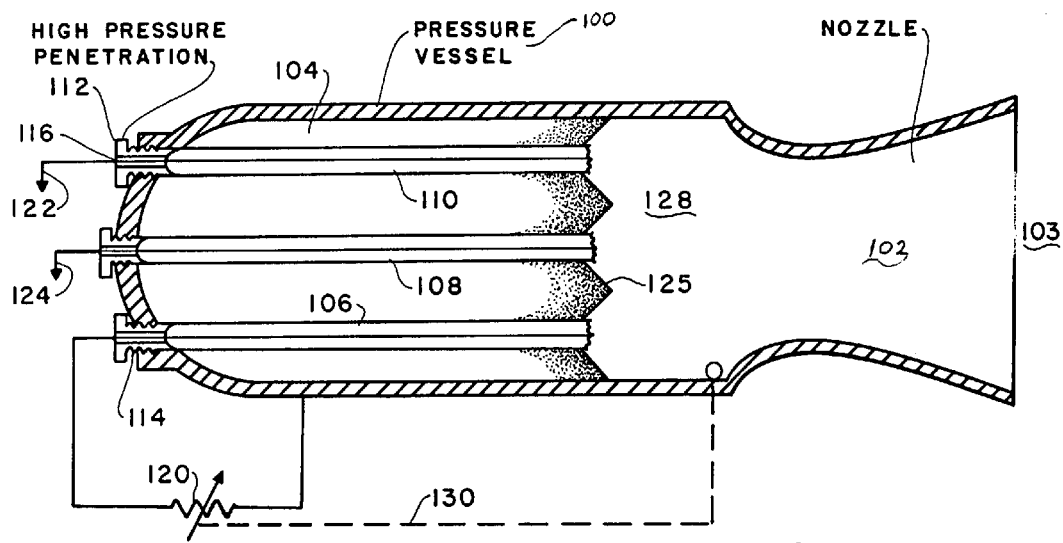
FIG. 1 is an overall view of a solid fuel rocket which employs electrical battery cell preheat burn rate control.

A solid fuel rocket motor of the end burn non-restartable type is shown in the lengthwise cross-sectional view of FIG. 1 in the drawings. In this FIG. 1 rocket motor, a pressure vessel 100 is shown to enclose a solid fuel charge 104, and a combustion chamber 128, and to be connected with or formed into a nozzle area 102 which opens into a gas stream area 103. Extending through the fuel charge or grain 104 in the FIG. 1 rocket are a plurality of control elements or preheating elements 106, 108 and 110 which also extend through the pressure vessel 100 by way of pressure fittings 112. The pressure fittings may include, for example, a threaded portion 114 and an electrode seal portion 116.

With respect to the fuel grain 104 in FIG. 1, it has been known in the solid fuel rocket motor art that the burn rate of many solid fuel compositions is variable according to the temperature of the fuel just preceding the onset of burning. In accordance with this concept the preheating of solid rocket fuels can increase the rate of fuel burning (and the burn chamber pressure) and the developed rocket thrust in a thrust controlling useful manner. The U.S. Pat. No. 4,369,710 of Okamoto, for example, employs this principle in improving the thrust of a solid fuel rocket motor.

Several factors become operative in the accomplishment of increased burn rate from local fuel preheating along a fuel embedded control element. These factors include the formation of cone-shaped distortions of the fuel burn area as is indicated at 125 in FIG. 1, with a resulting increase in the burning fuel surface area. Such increase in burning surface area occurs even though only a small portion of the fuel is heated by a control element—and therefore requires relatively small amounts of energy from the control elements in achieving meaningful thrust control. Increased burn surface area also provides an increased rate of gas generation from a rocket motor and this additionally results in higher pressure in the burn chamber 128. This increased pressure moreover can additionally increase the grain burn rate in closed circle or bootstrap fashion. In principle, the establishment of cone areas in the grain burn surface causes the burn process to regress at the speed of the fastest burning portion of the burn face over the entire face of the burn area.

The preheating required to achieve the burn face cones shown at 125 in FIG. 1 is therefore limited to relatively small volumes of the grain 104 and need not include the entire grain mass or even the entire burn face cross-section of the grain mass. In order to initiate this cone action the preheating need only involve small areas of the grain immediately adjacent to the preheating or control elements 106, 108 and 110 just below the grain burn surface. Preferably, therefore, preheating elements are dispersed uniformly across the surface of a burn face cross-sectional area of the grain 104 at distances providing desirable cone dimensions during grain burn. The three preheating elements shown in FIG. 1 are therefore typical or representative of larger or smaller arrays of such elements which would be employed in other embodiments of the invention. Additionally, the number of preheat elements and their spacings in other rocket embodiments depends upon the desired throttle frequency response of the rocket.

It should be realized that the relative orientations of the grain mass and the preheating elements shown in FIG. 1 is also only typical of the arrangements which might be achieved; for example, grain configurations having a hollow or contoured open center area with preheating control elements dispersed radially around the open center area and modulating radial burn propagation paths are also feasible.

The degree of preheating required to achieve increased burn rate is, of course, dependent upon the composition of the grain 104 in FIG. 1, the desired control signal response and other factors; generally however a heat responsive burn rate sensitivity is found in all of the commonly employed textbook solid rocket fuels. The degree of preheating required to initiate the illustrated cone action in these fuels normally falls short of fuel vaporization or phase change and is considered to be achievable using preheating of a few hundred degrees Centigrade or less.

Supplying of a portion of the energy required to elevate the temperature of fuel grain located just below the burn surface up to a burn enhancing preheat temperature from an additional energy source rather than from the grain burn reaction itself is one component of an improved burn rate control mechanism. Enhancement of this added energy component by way of increased pressure in the burn chamber can also occur.

According to one aspect of the present invention this burn enhancing localized preheat energy may be supplied by electrical loss heating in the electrolyte and electrodes of electrically conductive thermal cells or battery-cells which comprise the FIG. 1 preheat or control elements 106, 108, and 110. As also illustrated in FIG. 1 the electrical circuit by which this preheating energy is developed in the elements 106-110 may involve the structure of the pressure vessel 100; that is, one side of the preheat battery element 106 and the heat regulating element or rheostat 120 is connected electrically to the pressure vessel 100. This connection of course implies that the pressure vessel is fabricated of a conducting material such as high-temperature metal. Ceramic materials or multiple metal types or combinations of metal and ceramic materials may also be employed in fabricating the practical pressure vessel and nozzle apparatus, as is known in the rocket art. Use of the pressure vessel as a conductor in the pre-heating arrangement could be avoided, for example, by connecting the battery return directly to the pressure fittings 112 or by extending both cell electrical conductors through the fittings 112.

It should also be understood that the FIG. 1 apparatus might represent many different types of rocket motors, including for example, a ducted rocket involving a fuel-rich grain 104 and partial burn in the chamber 128 together with final burn in a secondary ram jet or turbine chamber, a gimbal mounted rocket such as might be employed where guidance and stability aiding capability are required, a propellant gas generator of the type sometimes used in starting turbine engines, or a small sized steering or stabilizing rocket or possibly any of the other rocket motor types known in the art.

Figure 2C:
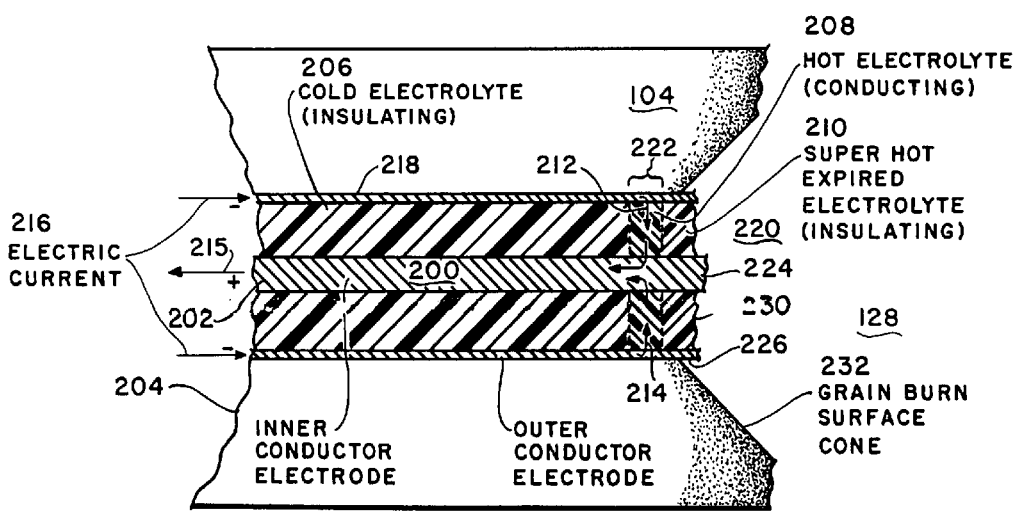
FIG. 2 is a more detailed view of a preheat burn rate control element.

One arrangement for the control or preheating elements 106-110 in FIG. 1 is shown in FIG. 2 of the drawings wherein there is depicted an enlarged cross-sectional view of an element, the element 106 in FIG. 1, for example. The FIG. 2 view also includes the grain 104, which was identified in FIG. 1, representations of the grain burn surface 232, the grain burn chamber 128, and an erosion face 220 where the control element 200 penetrates into the burn chamber 128. Additional details represented in FIG. 2 include the inner and outer conductor-electrode portions of the control element 200 which are shown at 202 and 218, respectively, and the cutting line 204 indicating the FIG. 2 view is less than a complete control element.

Battery electrolyte filler material having three different physical-chemical states, as are indicated at 206, 208 and 210 is also shown in FIG. 2, along with an electrical current path, various parts of which are indicated at 212, 214, and 216. Other FIG. 2 details of the control element 200 include a protruding portion 226 extending into the burn chamber 128, an extending portion of the inner conductor-electrode 202 shown at 224, a high electrical conductivity, high temperature zone 222, and an electrolyte gassification face 230.

According to an aspect of the present invention, the preheating of the grain 104 in FIGS. 1 and 2 is desirably accomplished with a moving situs hot zone within the control element 200. According to a further aspect of the invention, the location of this hot zone is determined by heat from the grain burn face as a result of this burn heat changing the characteristics of the electrolyte material 206. In the FIG. 2 control element the electrolyte material is therefore selected to be temperature responsive to a degree causing current flowing between the inner conductor-electrode 202 and the outer conductor-electrode 218 to concentrate in the hot zone or generating zone 222. This concentration results from the temperature responsive nature of the electrolyte material 206 and the temperature gradient existing along the length of the control element 200.

Outside of the hot zone or generating zone 222 in the control element 200, the electrolyte 206 to the left of the hot zone is relatively cool by reason of being surrounded by unburned fuel grain 104. This cool electrolyte is made relatively both non-conducting of electrical current and non-generating of electrical energy or electrical current. The electrolyte 210 residing on the right-hand or combustion chamber side of the hot zone or generating zone 222 is also in a non-electrical generating, non-conducting state. Effectively, therefore, only electrolyte in the zone 222 contributes to the generation of electrical energy and moreover, shunt current flow paths for this generated electrical energy as might exist in the electrolyte regions 206 and 210 for example, are made to be of minimal consequence.

In a broad sense of the invention, either the electrolyte material 206 or the conductor-electrode materials 202 and 218 may be arranged to enter the active liquid physical state as a result of the desired temperature responsive events attending the hot zone 222. Additionally, the electrode or electrolyte or both materials may be powdered in nature during some conditions of operation.

Assuming again that the FIG. 1 embodiment involves a liquefiable electrolyte, the non-conducting and non-generating state of the cool electrolyte 206 in FIG. 2 may be assisted by the fact that this portion of the electrolyte remains in a solidified state wherein migration of charge carriers as normally occurs in a liquid electrolyte is minimized. The relatively cool temperature prevailing in the unburned fuel grain 206 is conducive to this solidified and inactive electrolyte state. The non-conducting and non-generating state of the super-hot electrolyte 210 in FIG. 2 on the other hand, can result from one or more of the factors of electrolyte exhaustion from prior preheating use, electrolyte chemical decomposition from the temperatures of the combustion region, electrolyte evaporation, electrolyte sublimation, electrolyte melting and vaporizing, electrolyte spalling in the temperature and turbulence of the grain burning, or electrolyte inactivity at the temperatures of grain burning.

The physical and chemical characteristics of the conductor electrode elements 202 and 218 in the FIG. 2 control element may also be used to assist in the attainment of desired battery cell and electrolyte characteristics in the regions 206, 222 and 210. Since electrical energy generation in a battery cell involves chemical reaction or consumption of the conductor-electrode elements of the cell, the physical size and mass of the electrodes, their melting point, their curie temperatures and their temperature related chemical activities may be used as contributors to the above described three zones of battery cell and electrolyte performance. The conductor electrode elements 202 and 218 are different in chemical or metallurgical composition in order that positive and negative battery electrodes result from the chemical reaction between electrolyte and electrodes. Unwanted electrical shorting between the electrodes in the hot zones of control element operation may be prevented by such arrangements as insuring that the super-hot expired electrolyte remains physically intact beyond the ends of the conductor electrodes—at least past the point of conductor-electrode melting or disintegration between the electrodes 202 and 218.

The materials used in the FIG. 2 control element may also include additives of the type used in fabricating temperature responsive thermistor elements commonly used in electronic circuitry for compensating the effects of ambient temperature change and also used for sensing temperatures at remote locations in measuring equipment. Thermistors are commonly made from oxides of manganese, nickel, cobalt, copper, uranium, iron, zinc, titanium, and magnesium in proportions selected according to the desired temperature and electrical characteristics. Other materials may also be employed in composing the electrolyte material 206, for example, salts such as lithium chloride and potassium chloride (LiCl, KCl) are known to exhibit the desired characteristics of being an electrical insulator at low temperature, in the crystalline form, and an electrical conductor in the molten form at elevated temperature. Additionally, the following battery materials possess one or more of the characteristics needed in the FIG. 2 control element and may be considered for use in other embodiments of the invention:

Anode materials: Lithium aluminum alloys, other lithium alloys, calcium metal

Cathode materials: Iron disulfide ($FeS_2$), calcium chromate ($CaCrO_4$), nickel sulfide ($NiS_2$), copper oxide ($CuO$), titanium disulfide ($TiS_2$), Ferric Oxide ($Fe_2O_3$), and manganese dioxide ($MnO_2$).

Heating in the "active" zone 222 of the FIG. 2 control element can result from a plurality of energy transfer arrangements including resistance loss or $I^2R$ heating within the electrolyte 210, heating as a result of electrolyte-to-electrode "contact" resistances at both the positive or anode electrode 224 and the negative or cathode electrode 226 as well as from heating in the electrical resistance of the electrodes themselves; heating of these different types may be considered as electrical in nature. Heating which is chemical in nature, that is, exothermic chemical reactions within the electrolyte or between electrolyte and electrodes may also be present, however, most battery materials including those identified herein do not enter into such exothermic battery reactions.

It is desirable for the selected combination of these heating or energy transferring mechanisms to result in location of the zone 222 just below the gassification face 230 of the electrolyte and adjacent burn chamber 128 in FIG. 1 in order that optimum control of the thrust—that is, desirable cone action and favorable ratios between the control energy expended and the thrust change achieved be realized. The location of the active control zone 222 will, of course, move in response to the formation of cone regions and other progression mechanisms at the burn face during use of the rocket motor.

A number of battery cell component compositions known in the art may as noted above be adapted for use in the control elements 200 and the control elements of FIG. 1; among the more attractive of these combinations, however, is the calcium (anode)-calcium chromate (cathode)-lithium potassium chloride electrolyte cell and also possibly the elevated temperature sodium cell which has been proposed as a high energy density storage medium for electrically powered automobiles. The 350° C. range of operating temperatures required by this latter cell together with the solid state characteristics of the sodium electrolyte at lower temperatures are compatible with the herein described battery cell-control element. The calcium-lithium potassium chloride cell displays a desirable characteristic for the present use in its reversion to a high internal resistance when chemical activity is completed.

Other possible battery cell electrode materials for use in the present invention were identified above herein. Further details concerning these cells and additional high temperature battery cell materials are included in the following list of 450-550° C. operating temperature cell combinations.

| ANODE | ELECTROLYTE | CATHODE |
|---|---|---|
| LiAl (Alloy) | LiCl—KCl Eutectic Mix | $FeS_2$ |
| LiAl | LiCl—KCl | $NiS_2$ |
| LiAl | LiCl—KCl | $Fe_2O_3$ |
| LiAl | LiCl—KCl | $TiS_2$ |
| LiAl | LiCl—KCl | $MaO_2$ |

A sodium positive ion conducting ceramic may also be used as an electrolyte material in the control element of the present invention; beta double prime alumina is an example of such material.

Although several arrangements for disposing the electrolyte material 206 between two conductor-electrodes and along the cross-section length of the grain 104 are feasible, the FIG. 2 illustrated coaxial arrangement is desirably simple and effective. This coaxial arrangement wherein the electrolyte material assumes an annular shape occupying the space between two coaxial conductor-electrode members provides a convenient and protecting package for the electrolyte and thereby facilitates handling of the control elements during their manufacture and during rocket motor assembly. An alternate disposition of the electrolyte material is also described below in connection with FIG. 3 of the drawings.

FIG. 2 illustrates the desired burn surface cones at 232 and also illustrates the expected survival of the control element structure for a short distance into the burn chamber as is illustrated at 226. Heat conductivity of the inner and outer conductor-electrode members 202 and 218 of course contributes to the preheating of the grain 104 and achieving of the desired cone shape during grain burn. This conducted heat is, however, herein substantially supplemented by the battery sourced energy heat dissipation in the zone 222.

The attainment of effective preheating conditions in the zone 222 may in one sense be characterized as a type of "thermal runaway"; a self-driving or closed loop cause-and-effect sequence wherein the initially supplied heat from the burn chamber 128 causes electrical heating in the zone 222 and this electrical heating in turn enhances the electrical activity of the electrolyte material 206, thereby causing additional heating in the zone 222 and additional increases in electrical activity in the electrolyte 206. This thermal runaway condition is of course, finally interrupted when the temperature in the zone 222 becomes high enough to reach the super hot characteristics indicated for the material at 210, or when the burn face merges with the subsurface edge of the zone 222. The thermal runaway condition is also, of course, modulated or controlled by the heat regulator element or rheostat 120. Parenthetically speaking and for descriptive convenience herein, the conducting zone 222 is described as being "below" or subsurface to the burn surface 232 even though the illustrated burn surface 232 and erosion face 220 are not horizontal in disposition, as might be implied by use of the word "below".

In addition to the above-indicated materials and the salts of lithium, potassium, chlorine, and sodium which may be employed for the electrolyte material 206 in FIG. 2, the compositions commonly employed in electric furnace heating such as silicon carbide based materials, may also be useful additions to the control element 200. Silicon carbide is commonly employed for generating temperatures of up to 1800° F. (980° C.) and is therefore capable of operation at points along the temperature gradient found between the burn chamber 128 and the cold end of the control element 200. Variations in the composition of the silicon carbide based material may be necessary in order that activity be confined to the hot zone 222 or at least be significantly lower in the colder portions of the control element 200. The presence of zero conductivity in portions of the electrolyte material 206 preceding the zone 222 is of course not essential; the desired concept is that a large fraction of the generated electrical heat be located in a relatively small zone below the burn surface and that energy losses in remaining portions of control element be small enough for electrical energy consumption convenience.

The electric current indicated at 212, 214 and 216 in FIG. 2 and thereby the heat generated in the zone 222 is preferably controlled in magnitude by electrical circuit elements which may include power transistors, silicon controlled rectifiers, electrical resistance or other arrangements known in the art for varying the magnitude of an electrical current flow. Since the electric potential of the one battery-cell comprising the control elements shown in FIGS. 1 and 2 is limited to a few volts of battery terminal voltage, the electrical resistance employed in the heat regulating element at 120 and the current levels involved in achieving significant heating in the zone 222 will be small and large in magnitude, respectively; battery voltages between one and two volts, resistance values of a few milliohms and current levels in the tens or hundreds of amperes or more for each control element are contemplated according to the present state of the battery art. Control of the currents 212-216 may include either an on-off time modulation switching control or an electrical magnitude or proportional control or combinations of the two arrangements in order to elect the electrical operating condition for the FIG. 1 control elements.

A closed-loop arrangement wherein heating in the zone 222 is made responsive to the difference between attained and desired rocket motor thrust by the regulator element 120 is also feasible. A feedback path for such closed-loop control is indicated at 130 in FIG. 1 of the drawings. Coincident operation between the regulator element 120 and similar elements connected to the electrical leads 122 and 124 of the control elements 108 and 110 is also contemplated in FIG. 1. The signal controlling the heat regulating element 120 in FIG. 1 and the similar elements for the leads 122 and 124 may of course include a thrust demand or throttle signal to which the feedback signal from the path 130 is compared.

Figure 3C:
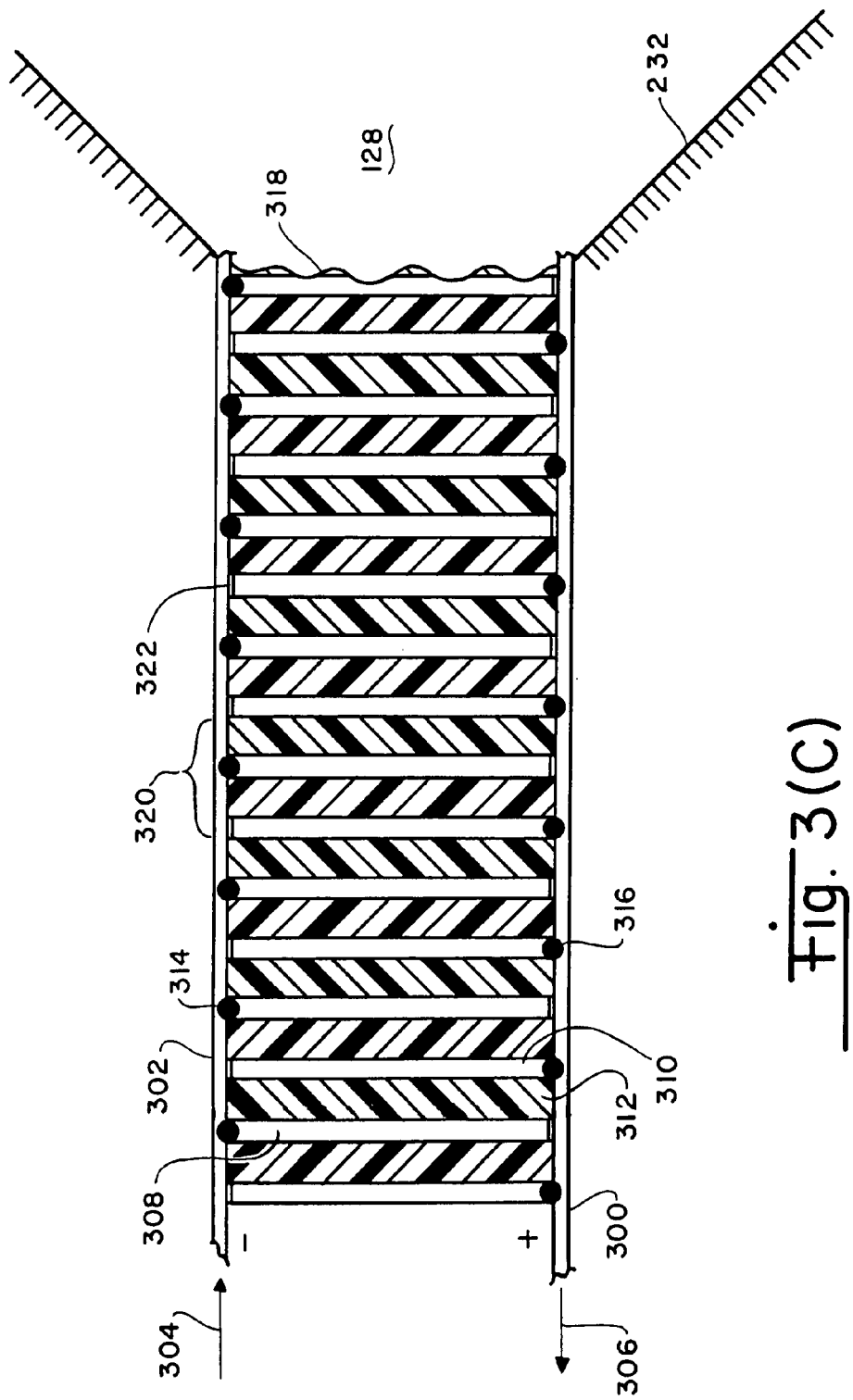
FIG. 3 is a view of an alternate preheat burn rate control element showing several arrangement details thereof.

In FIG. 3 of the drawings there is shown an alternate arrangement of the FIG. 1 and FIG. 2 electrical battery cell control element. The FIG. 3 control element is comprised of a plurality of parallel connected battery cell elements of the type indicated at 320 with each of the parallel connected cells including an anode element 310, a cathode element 308, and a region of solidified electrolyte 312, interlaying each of the anode and cathode elements.

In the FIG. 3 control element arrangement, each of the anode elements is joined to a common anode lead 300 by means of welding or other attachment arrangements known in the art; this attachment is indicated at 316. In a similar manner, each of the cathode elements 308 in the FIG. 3 control arrangement is joined to a common cathode lead 302, by way of a second group of attachments which are indicated at 314. Additional details shown in FIG. 3 include the propellant burn surface cone 232, the burn or disintegration surface 318 of the battery elements adjacent the burn chamber 128, and current flow indications 304 and 306 representing the current which flows as a result of forming a hot zone active region—i.e., a region 222 in FIG. 2 in one or more cells of the FIG. 3 control element.

The non-attached ends of the anode and cathode elements 310 and 308 are insulated from the leads 300 and 304 in FIG. 3 by the presence of physical space as is illustrated in exaggerated form, for example, at 322 in FIG. 3. Alternately, the space 322 may be filled with some electrically non-conducting material such as a plastic or ceramic substance in order to assure the presence of electrical insulation and non-shorting of the anode and cathode lead circuits during high temperature and other operating conditions of the FIG. 3 control element.

According to the FIG. 3 control element representation, the concentric conductor electrode elements of the FIG. 2 control element arrangement are replaced by two parallel disposed leads, the leads 300 and 302, between which are located the parallel disposed anode and cathode elements which comprise the electrical battery cell of the FIG. 3 control element. The operational concepts of the FIG. 3 control element insofar as element characteristics, types of electrolyte, anode and cathode materials, electrical parameters, and so on are similar to the properties described above for the FIG. 2 control element, however, the relatively larger elemental surface areas provided in the FIG. 3 control element offer advantages with respect to greater electrolyte to electrode exposure areas, fabrication convenience, configuration flexibility, and other advantages. The control element of FIG. 3 may be surrounded by a protective separating member such as a plastic or ceramic sleeve, which segregates the battery and fuel grain materials and allows convenient handling of the control element and its surrounding liquefied propellant grain during rocket fabrication.

The cross-sectional shape of the control element shown in FIG. 3 may be arranged in accordance with the preheating needs of the thrust controlled rocket. Consequently a circular, elliptical, oval, or even rectangular cross-section may be arranged in accordance with the FIG. 3 drawing to accommodate the employed fuel grain configuration and the desired cone formation pattern. The electrical leads 300 and 302 may be conducted through the frontal pressure wall of the rocket by individual fittings of the type shown at 112 in FIG. 1 or alternately may be passed through a common fitting which provides electrical insulation of the leads from each other and from surrounding metallic elements and also providing physical support for the control element.

The present invention provides several advantages which are useful in attaining improved solid fuel rocket motor performance; these advantages include the initiation of grain cones under controllable conditions and while using a uniform mixture of fuel grain rather than an intentionally non-homogeneous grain mixture as might be otherwise necessary to achieve cones. Additionally, in the present invention no moving parts are required in order to achieve the burn rate and variable thrust control; and moreover the complexities of high temperature moving parts normally encountered with variable nozzle burn rate control arrangements are avoided. The present apparatus is also readily adapted for use with a ducted rocket as well as various configurations of primary rockets. The electrical control of the present invention is convenient for use in modern-day vehicle environments, including arrangements wherein the control elements are incorporated into a feedback loop which operates in response to burn chamber pressure or thrust measuring arrangements. The control of the present invention also results in lower pressure vessel pressure excursions, for the same mass flow excursions, than does the known throat valve controls—assuming the propellant pressure exponents are less than one, as are the type now in use.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. Thrust controllable solid fuel rocket motor apparatus comprising:
    a rocket pressure vessel containing a solid fuel grain charge and disposed in communication with a rocket nozzle;
    means for initiating burning of said rocket fuel at a grain burn surface communicating with said nozzle;
    electrical battery heating means including a plurality of battery cell elements disposed within the body of said fuel grain for locally preheating and increasing the burn rate of a plurality of grain regions dispersed over said burn surface with battery cell sourced preheat energy;
    said preheat energy sourcing and said localized grain preheating by said battery heating means being enabled in local regions of said battery cell elements by battery activating heat energy originating in said grain surface burning; and
    electrical means connected with said battery cell elements for controlling the quantity of said preheating energy generated therein.

2. The apparatus of claim 1 wherein said battery cell elements include electrolyte material which is substantially inactive and electrically insulating at room temperature and active electrically and chemically at elevated temperatures between room temperature and the temperature of said burn surface.

3. The apparatus of claim 2 wherein said electrolyte material is also characterized by decreased electrical conductivity in the burn surface passed over, nozzle adjacent portions thereof.

4. The apparatus of claim 2 wherein said electrolyte material includes a metallic salt.

5. The apparatus of claim 4 wherein said material includes a sodium positive ion conducting ceramic.

6. The apparatus of claim 5 wherein said conducting ceramic is Beta double prime alumina.

7. The apparatus of claim 2 wherein said rocket motor is of the end burn type and wherein said battery cell elements each comprise a pair of coaxially disposed burn consumable electrical conductor burn rate control element members disposed extending through said fuel grain charge.

8. The apparatus of claim 1 wherein said battery sourced preheat energy originates in battery cell losses within said battery cell elements.

9. A method for controlling the thrust of a solid fuel grain rocket motor comprising the steps of:
  igniting the rocket fuel at a grain face burn surface;
  sensing the progression of grain burn surface high temperature locus into the grain body;
  generating electrical energy in grain surrounded battery elements locally triggered to generation by the sensed temperature at said grain burn surface;
  preheating a plurality of localized grain regions, disposed across the grain face of said burn surface, and immediately below said burn surface with heat generated by said electrical energy; and
  modulating the flow of said electrical energy and said preheating in response to rocket thrust change requirements;
  whereby grain face cone-shaped regions of increased burn surface area are promoted intermediate said grain preheat regions.

10. The method of claim 9 wherein said steps of sensing and generating are both accomplished in thermally responsive battery cell elements.

11. The method of claim 9 wherein said generating step includes fixing the location of electrical energy heating within said grain body in response to said sensing of burn face progression into said grain body.

12. The method of claim 9 wherein said preheating is accomplished by electrical losses incurred during electrical current flow from said generated electrical energy in said battery elements.

13. A control element for adjusting the burn rate of a solid fuel rocket motor comprising:
  chemically distinguished parallel spaced electrically conductive battery electrode members receivable within the pressure vessel and the solid fuel mass of the rocket motor;
  means including a pressure seal member for communicating electrical energy from said pressure vessel received electrode members to the exterior of said pressure vessel; and
  a mass of solidified and elevated temperature liquefiable battery electrolyte material dispersed along and between said electrode members within said solid fuel mass in the rocket motor, said electrode members forming an electrical battery cell with said electrolyte material in the liquid electrolyte state thereof;
  whereby electrical energy dissipation and battery heat induced fuel preheating occur within said pressure vessel in the burn-heat adjacent liquefied end portion of said electrolyte material adjacent the combustion surface of the solid fuel mass in response to quantitative control of said electrical energy communication.

14. The control element of claim 13 wherein said electrode members comprise a concentric coaxial pair of conductors and wherein said coaxial conductors are separated by an annular shaped mass of said liquefiable electrolyte material.

15. The control element of claim 14 wherein said electrolyte material has large electrical resistance at both low temperatures and combustion temperatures and low electrical resistance at temperatures intermediate said low and combustion temperatures;
  whereby little electrical heat is generated in the control element portions deep within said rocket fuel mass and at said fuel combustion surface and maximum electrical heat is generated in the fuel mass portion immediately below said combustion surface.

16. The control element of claim 13 wherein said electrode members are consumable in the temperature of said burn heat.

17. The control element of claim 13 wherein said electrode members are of substantially equal physical dimension and are parallel spaced along the lengthwise extent of said solid fuel mass.

18. The apparatus of claim 1 wherein said electrical means connected with said battery cell elements includes electrical current flow controlling means disposed external of said pressure vessel.

19. The apparatus of claim 1 wherein said plurality of battery cell elements includes lengthwise disposed unitary battery cell elements dispersed across the fuel grain burn surface area and extending into the fuel grain body along the progression path of said burn surface.

20. The apparatus of claim 1 wherein said plurality of battery cell elements includes arrays of plural battery cell elements dispersed across the fuel grain burn surface area with each array including a stacked sequence of individual battery cell elements that are serially accessed during burn surface progression.

* * * * *